Oct. 3, 1961   S. I. MacDUFF   3,002,765
AUTOMATIC LEVELING HYDRO-PNEUMATIC SUSPENSION
SYSTEM FOR VEHICLES
Filed Feb. 27, 1957   2 Sheets-Sheet 2

INVENTOR.
STANLEY I. MAC DUFF
BY
*William N. Antonie*
ATTORNEY.

United States Patent Office 3,002,765
Patented Oct. 3, 1961

3,002,765
AUTOMATIC LEVELING HYDRO-PNEUMATIC
SUSPENSION SYSTEM FOR VEHICLES
Stanley I. MacDuff, South Bend, Ind., assignor to The
Bendix Corporation, a corporation of Delaware
Filed Feb. 27, 1957, Ser. No. 642,723
2 Claims. (Cl. 280—124)

This invention relates to vehicular suspensions and more particularly to suspensions of the hydro-pneumatic type.

An object of this invention is to provide a suspension system for a vehicle which will automatically adjust itself to the load conditions of the vehicle and the nature of the road surface.

Another object of this invention is to provide a hydro-pneumatic suspension system which will maintain the desired spring frequency and road clearance.

A further object of this invention is to provide a three point automatic leveling suspension system for a vehicle which includes a pair of or dual leveling valves for controlling the suspension units associated with the front wheels and a single leveling valve for controlling the suspension units associated with the rear wheels.

A still further object of this invention is to provide for my suspension system leveling valves having normally slow response rates with means incorporated therewith for providing a fast valve response rate during certain vehicular activity.

An important object of this invention is to provide in a suspension system having automatic leveling valves, novel means for permitting the inertia forces developed while turning, braking, or acclerating to modify the function of the leveling valves in order to eliminate the usual "roll," "drive,' and "squat" characteristics of a vehicle.

Another object of this invention is to provide a hydro-pneumatic suspension system that could fully eliminate the need for metal suspension springs.

The above and other objects and features of the invention will become apparent from the following description of the apparatus taken in connection with the accompanying drawings which form a part of this specification and in which:

FIGURE 4 is a section taken substantially along line 4—4 of FIGURE 3 to show the relationship of the two front leveling valves; and FIGURE 5 is a schematic illustration of a portion of my suspension system shown with the inertia controlled mechanism positioned to respond to acceleration, deceleration, and/or centrifugal forces.

Figure 1:
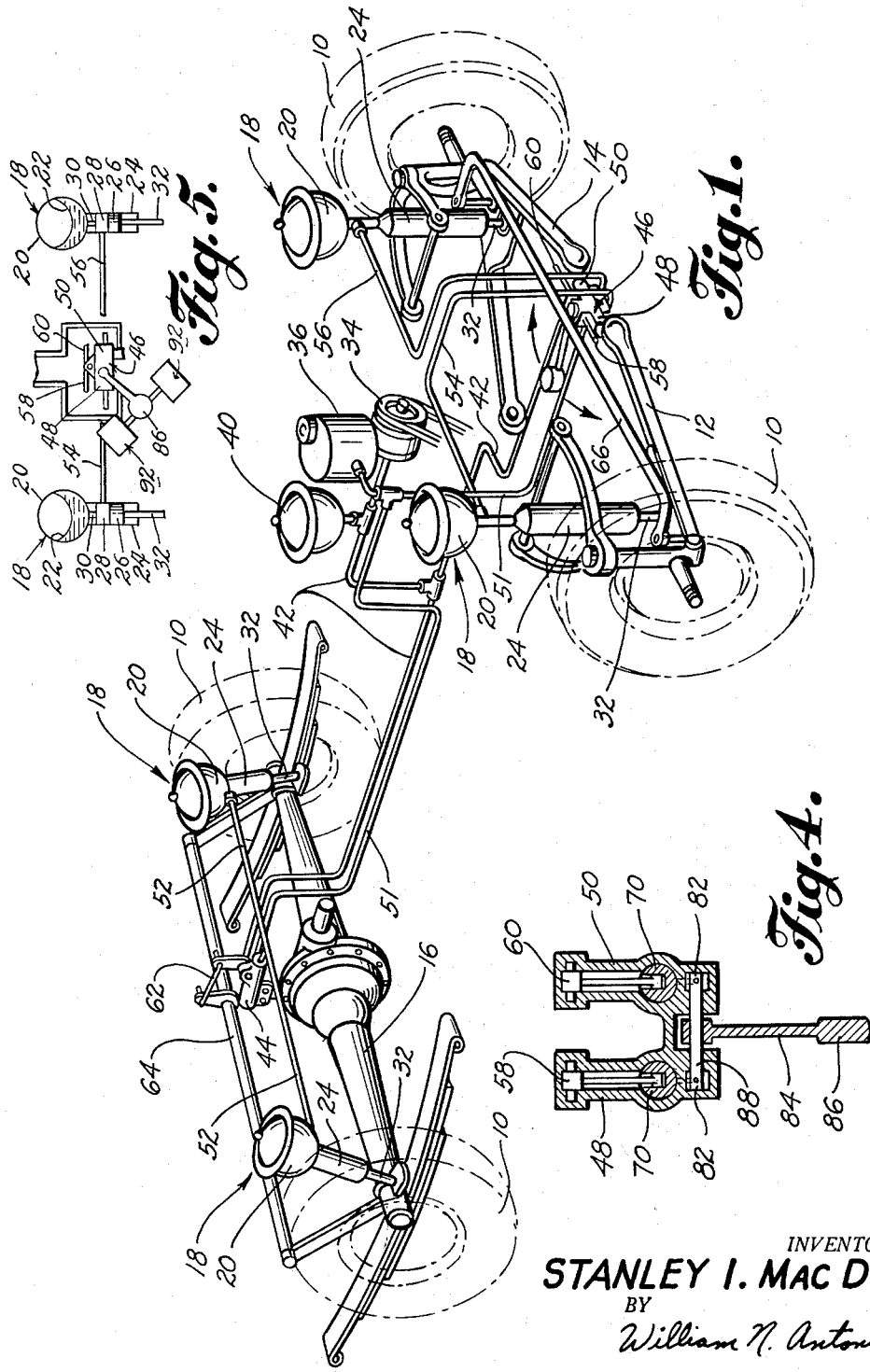
FIGURE 1 is a perspective view of my hydro-pneumatic suspension system in operative position on a ground vehicle.
Figure 2:
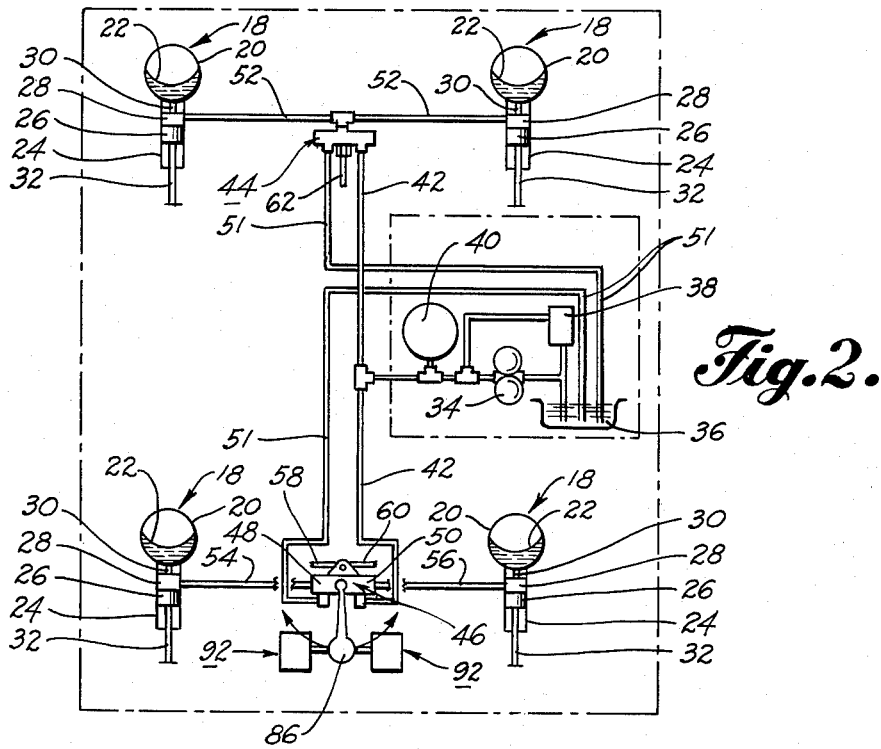
FIGURE 2 is a schematic illustration of my suspension system shown in connection with the hydraulic circuit therefor.

Referring to FIGURES 1 and 2 it will be seen that I have shown my suspension system in connection with a ground vehicle having wheels 10, wheel attaching members 12 and 14, and axle 16. Each wheel is provided with a suspension assembly 18 which includes an accumulator 20 having a bladder 22 for confining a quantity of compressed gas, a hydraulic cylinder 24 having a piston 26 reciprocable therein, a hydraulic chamber 28 formed between the bladder 22 and the piston 26, and a damping valve 30 located in chamber 28. A strut 32, extending from each of the pistons 26, is connected to each of the wheel attaching members 12 and 14 and to each end of the axle 16, while the cylinders 24 are suitably connected to the frame (not shown) of the vehicle. The construction of the suspension assembly is such that it will tend to act as a shock absorber.

The vehicle is equipped with a central hydraulic system which may consist of a pump 34 which preferably is engine driven, a reservoir 36, an accumulator charging valve 38, and an accumulator 40. Fluid from the accumulator 40 passes through conduit 42 to a rear automatic leveling valve 44 and to a forward automatic dual leveling valve 46 which actually consists of two leveling valves 48 and 50 in a single housing. Return conduits 51 carry fluid from these valves back to the reservoir 36. The rear leveling valve 44 controls the two rear suspension assemblies 18 via conduits 52, while the front leveling valve 48 controls one of the front suspension assemblies 18 via conduit 54 and the other front leveling valve 50 controls the other front suspension assembly 18 via conduit 56. Actuation of the front leveling valves 46 and 48 is provided by a position signal obtained through linkages 58 and 60 which are illustrated as being connected to the wheel attaching members 12 and 14 of each front wheel. The rear leveling valve is actuated by a position signal obtained by a linkage 62 secured to the center of a torsion anti-roll bar 64 interconnecting the ends of the rear axle 16. The position signal could also be obtained through a linkage which is connected to the center of the axle. The front suspension, as illustrated, is also provided with a torsion anti-roll bar 66.

Figure 3:
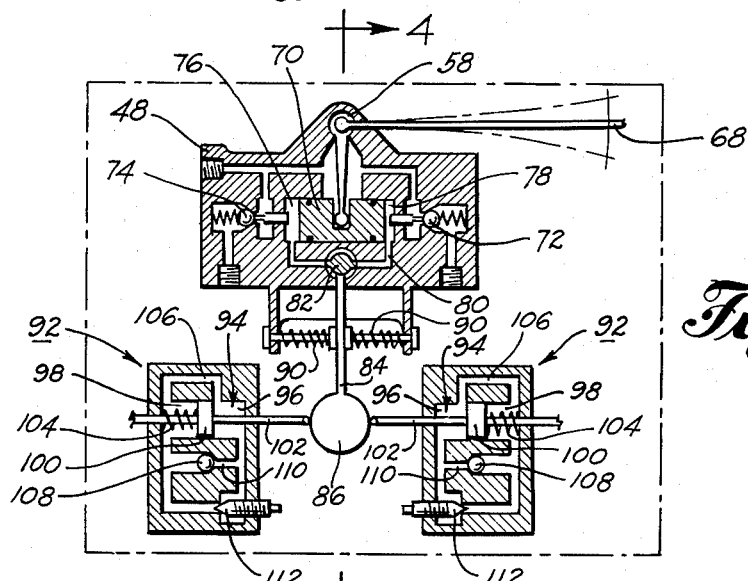
FIGURE 3 is a sectional view of one of the front leveling valves and the inertia controlled mechanism associated therewith.

Since the rear leveling valve 44 and the two front leveling valves 48 and 50 in my suspension system are identical, only one of them will be discussed. FIGURE 3 shows a sectional view of one of the front leveling valves and FIGURE 4 shows the relationship of the two front leveling valves to each other. Referring to FIGURE 3, it will be seen that the position input signals are transmitted to the leveling valve through an elastic means 68 illustrated as a leaf spring lever. This signal in turn is transmitted to a dashpot piston 70 which may have a predetermined travel or lost motion before engaging admission valve 72 or exhaust valve 74 for respectively admitting or exhausting pressure fluid to and from the connected suspension assembly 18. The admission or exhaust of fluid from chamber 28 of the suspension assembly will result in a raising or lowering of the vehicle in response to the received signal. The opposed chambers 76 and 78 of the dashpot are interconnected by a passage 80 through which passage restricted flow of fluid is permitted by a valve plug 82 when said plug is positioned as shown in FIGURE 3. Attached to this valve plug, by suitable means, is a lever 84 which has an enlarged mass or weight 86 connected to its end. Thus, if nothing disturbs this mass, the leveling valve will function with a time delay in proportion to the lost motion referred to above and the resistance provided by the valve plug 82. However, if inertia forces cause the mass 86 to shift, the valve plug 82 will rotate sufficiently so that the resistance in this passage will be materially reduced and substantially free communication will be permitted between opposed chambers 76 and 78. Consequently, the time delay in the valve response will be eliminated and the suspension system will respond immediately to the limit of the capacities of the hydraulic system to the position change signals received as a result of the vehicle body rolling or pitching, or both, depending upon the neutral disposition of the mass 86. The mass 86 in FIGURES 1, 2 and 3 is illustrated as having a neutral position in a fore and aft plane, in which case it would respond to centrifugal forces resulting when the vehicle is traveling in a curved path and would serve to counteract a tendency of the vehicle to "roll." If the mass were disposed in a lateral plane it would respond to accelerations and decelerations due to starting and braking and would therefore tend to counteract pitch. It would also be possible to dispose this mass in a plane intermediate to those previously described so as to respond in varying degrees to forces of all types. Note FIGURE 5 wherein the mass 86 is angularly positioned in such an intermediate plane so as to respond to acceleration, deceleration, and/or centrifugal forces acting thereon. It is also contemplated that a similar inertia operated member could form a part of the rear leveling valve, positioned so as to be responsive to acceleration only for the most effective control of "squat" on take-off. Referring to FIGURE 4 it will be seen that the mass 86 controls the rate of response of both of the front leveling valves 48 and 50 by controlling movement of both the valve plugs 82 which are formed on a common spindle 88 to which the lever 84 is attached. Separate inertia weights in various combinations may be used as desired.

It will be noted that in FIGURE 3 I have illustrated the inertia mass as being provided with centering springs 90 which normally hold it in a neutral or center position. The normal loading of the springs 90 can be varied to determine the low limit of inertia forces under which no stabilizing effect will be created. In order to insure that the leveling valves will cause the suspension assemblies to restore the vehicle to a normal position upon the cessation of the inertia forces acting thereon as quickly as they caused the suspension assemblies to counteract the forces, I also illustrate some special dash pots 92 affecting the movement of weight 86 (or weights if more than one is used to counteract the various types of inertia forces) in such a manner as to permit the weight to move off center freely against the load of the previously mentioned centering springs 90, but serving to delay its return to center for a predetermined time interval after the disappearance of the inertia actuating force. These dash pots are illustrated as being two in number, one serving to control movement of the mass 86 to one side of its neutral or center position and the other serving to control movement of the mass to the other side of its neutral or center position. The dash pots include a double acting dash pot cylinder 94 divided into chambers 96 and 98 by a piston 100 having a piston rod 102 which is urged into contact with the inertia weight 86 by a spring 104. A neutral by-pass passage 106 extends from chamber 98 to chamber 96. This by-pass 106, which terminates in chamber 96 at a point which is just past piston 100 when the piston is in its normal or center position, permits this piston to move freely to one side of center, namely in the direction which causes the compression of spring 104. A check valve 108 in passage 110 which communicates chambers 96 and 98 permits the piston to move freely in the opposite direction (towards mass 86) and an adjustable needle valve 112 impedes the return of the piston to its normal or center position from this opposite direction. If, as previously mentioned, the inertia control is limited to one direction only, one half of the centering spring structure 90 and one of the dash pots 92 may be eliminated and a fixed abutment substituted therefor, so that movement of the inertia weight will be limited to one direction only. When this is done the inertia weight return time delay dash pot may be simplified by elimination of the by-pass passage 106.

In general, the operation of the device will be as follows:

With the vehicle at rest, any load changes which may occur will cause a position signal to be transmitted to the effected leveling valve or valves, but due to the resistance encountered by the dashpot piston 70 in the valve, this signal results at first only in a deflection of the leaf spring lever 68. If the position signal persists for a predetermined time interval, the continuous force exerted against the dash pot piston 70 moves the piston through its lost motion interval until it engages the appropriate admission valve 72 or exhaust valve 74 and thereby permits flow of fluid into or out of the appropriate suspension assembly 18 until the input signal is reduced to zero. If the vehicle is traveling along a straight highway and the wheels are raised or lowered by highway irregularities, the corresponding signal transmitted to the valve will result in the deflection of the leaf spring lever 68, but since these signals will have only a short duration, no admission or exhaust of fluid to the suspension assemblies 18 will occur. Thus under normal straight ahead driving conditions the front and rear leveling valves have a normally slow response rate, since the damping means associated therewith provide for a time delay in the actuation of the valves. However, when the vehicle enters a curve in the road, centrifugal forces acting thereon start to cause the body of the automobile to roll to the outside of the curve. At the same time the centrifugal forces act on the inertia weight 86 (or weights as the case may be) of the forward leveling valves causing the weight to move against the force of the centering springs 90. Movement of weight 86 causes one of the dashpot pistons 100 to be moved in a direction tending to compress its associated spring 104, while the other dashpot piston 100 is caused to move toward and follow the weight 86 due to the force exerted thereon by the other spring 104. Thus, one of the springs 104 will have caused its associated piston 100 to move beyond the vertical portion of passage 106 which communicates with chamber 96, so that the return movement of weight 86 will be impeded. This impeding action will occur because flow from chamber 98 to chamber 96 will initially be permitted only through restriction 112 until piston 100 is moved to a position which will permit communication between chambers 96 and 98 via passage 106. As the vehicle body rolls, a signal is transmitted to the leveling valves and since the inertia weight 86 is off center, the dash pot restriction provided by valve plug 82 in passage 80 will not be functioning and an instantaneous response to the signal will occur so that fluid may be valved into the outside suspension assembly and fluid relieved from the inside suspension unit. (The words "outside" and "inside" refer to a position relative to the curve which the vehicle is traveling.) This transfer of fluid increases the load being carried by the outside suspension assembly, decreases the load being carried by the inside suspension assembly, and results in a couple which resists the roll movement on the body. If the couple persists long enough the body of the vehicle will be restored to its normal position. As the vehicle leaves the curve this moment created by the unequal pressures in the suspension assemblies will tend to move the body into a roll position opposite to that previously assumed. Since the inertia weight time delay dash pot 92 will now be functioning to hold the inertia weight off center, the roll signals thus created will again obtain an instantaneous response resulting in a rapid exhaust of fluid from the former "outside" suspension assembly and a rapid admission of fluid to the former "inside" suspension assembly, thus quickly restoring the vehicle to a level position. At the end of an opposite interval of time the force exerted by centering spring 90 on the inertia weight 86 will cause it to move back to center against the controlled resistance of the associated time delay dash pot 92. When this occurs the leveling valves will have been restored from their fast response rate to their normal slow response rate.

Although my invention has been described in connection with certain specific embodiments, the principles are susceptible of numerous other applications that will readily occur to persons skilled in the art.

Having thus described the various features of my invention what I claim as new and desire to secure by Letters Patent is:

1. A suspension system for motor vehicles having a frame and wheels, said system comprising fluid suspension means connected between the frame and the wheels of the vehicle, a pressure source, valve means associated with said suspension means for regulating the pressure therein, actuating means responsive to relative movement between said frame and said wheels connected to said valve means for actuating said valve means, damping means associated with said actuating means for providing a time delay in the actuation of said valve means, and inertia controlled means associated with said damping means for eliminating said time delay, said last named means including a mass movable from a normally center position as a result of acceleration, deceleration, and centrifugal forces acting thereon, and dash pot means associated with said mass for permitting free movement of said mass away from center but impeding the return of said mass to center for a predetermined time interval after the cessation of forces acting thereon.

2. In a vehicle having a frame and wheels, a suspension system comprising fluid suspension means connected between each of said wheels and said frame, a pressure source, a reservoir, valve means associated with said suspension means for regulating the pressure therein, said valve means having an admission valve for communicating said suspension means with said pressure source and an exhaust valve for communicating said suspension means with said reservoir, a chamber formed between said admission and exhaust valves, a dash pot piston movable in said chamber for opening said admission and exhaust valves, passage means communicating opposite ends of said piston, a valve plug in said passage preventing communication between the opposite ends of said piston when in a normally neutral position in said passage, actuating means responsive to relative movement between said frame and said wheels connected to the piston for moving said piston, a weight movable from a normally center position in response to inertia forces acting thereon, said weight being connected to said valve plug for moving said valve plug from its normally neutral position and communicating the opposite ends of said piston with each other, and dash pot means associated with said weight for permitting free movement of said weight away from center but delaying the return of said weight to center for a predetermined time interval after the cessation of forces acting thereon.

References Cited in the file of this patent

UNITED STATES PATENTS

| | | |
|---|---|---|
| 2,653,021 | Levy | Sept. 22, 1953 |
| 2,670,201 | Rossman | Feb. 23, 1954 |
| 2,778,656 | May | Jan. 22, 1957 |
| 2,849,225 | Lucien | Aug. 26, 1958 |
| 2,934,354 | Vogel | Apr. 25, 1960 |

FOREIGN PATENTS

| | | |
|---|---|---|
| 1,110,452 | France | Feb. 13, 1956 |

OTHER REFERENCES

Popular Science Magazine, January 1957, pages 125 to 128.

German application, 17488 11/63c, Mar. 1, 1956.

UNITED STATES PATENT OFFICE
CERTIFICATE OF CORRECTION

Patent No. 3,002,765                                October 3, 1961

Stanley I. MacDuff

It is hereby certified that error appears in the above numbered patent requiring correction and that the said Letters Patent should read as corrected below.

Column 1, line 35, for '"drive,'" read -- "dive," --.

Signed and sealed this 1st day of May 1962.

(SEAL)
Attest:

ERNEST W. SWIDER
Attesting Officer

DAVID L. LADD
Commissioner of Patents